July 14, 1942.  S. J. HARLEY ET AL  2,290,045
GAUGING OF INTERNAL SCREW THREADS
Filed Jan. 6, 1941  3 Sheets-Sheet 1

Inventors
Stanley J. Harley
John E. Wainwright
by Babcock & Babcock
Attorneys

July 14, 1942.   S. J. HARLEY ET AL   2,290,045
GAUGING OF INTERNAL SCREW THREADS
Filed Jan. 6, 1941   3 Sheets-Sheet 2

Inventors
Stanley J. Harley
John E. Wainwright
by Babcock & Babcock
Attorneys

Patented July 14, 1942

2,290,045

UNITED STATES PATENT OFFICE 2,290,045

GAUGING OF INTERNAL SCREW THREADS

Stanley Jaffa Harley and John Ernest Wainwright, Coventry, England

Application January 6, 1941, Serial No. 373,374
In Great Britain March 8, 1939

6 Claims. (Cl. 33—199)

This invention relates to internal screw thread gauges of the kind including one or more gauging members arranged for radial or diametral displacement within the screw threaded hole and means for accurately measuring such displacement.

Gauges embodying the present invention are distinguished from existing gauges of the kind referred to in that the gauging member or members consist of one or more freely rotatable rollers having thread form serrations.

Figure 1:
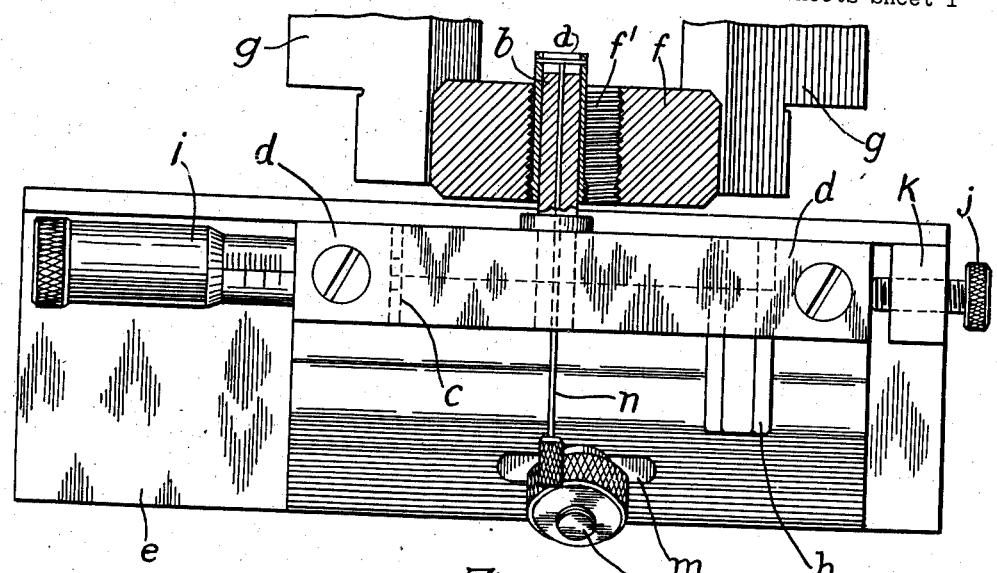
Figures 1 and 2 are a plan and an end elevation respectively, both partly in section, of a gauge constructed according to the invention.
Figure 2:
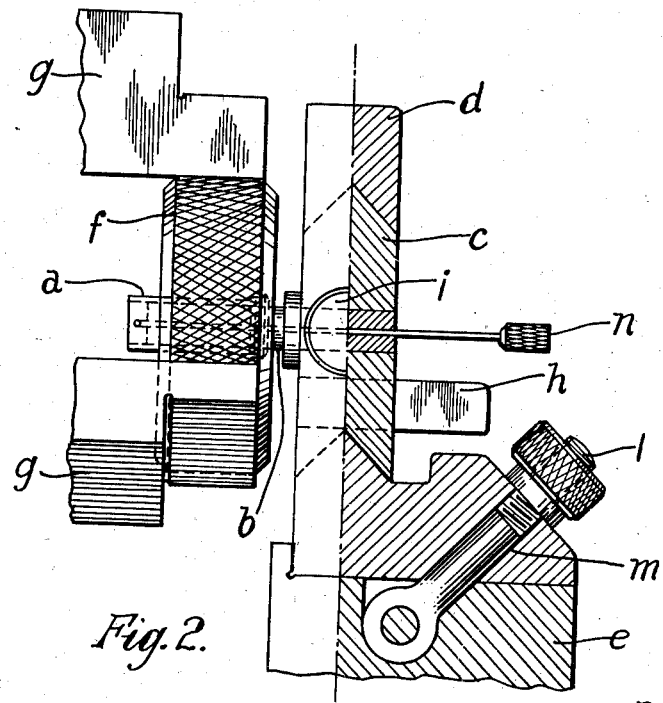

Referring more particularly to Figures 1 and 2 of the drawings which illustrate the simplest form of the improved gauge, $a$ is the gauging member which is in the form of a roller having external serrations. These serrations are preferably annular and may extend along the full length of said roller, or there may be only a small number of them situated at one end of the roller as clearly shown in Figure 1.

The roller $a$ is tubular and rotatably mounted on a pin $b$ fixed to a carriage $c$ which is slidably mounted in the body $d$ of the gauge. The said gauge body $d$ is mounted on a table $e$ fixed to the grinding machine (not shown). The table $e$ is so positioned on the grinding machine that the roller can be accurately presented to the work whilst in situ and so that the carriage $c$ slides in a direction parallel with the diametral plane of the hole to be gauged.

In using the gauge, the body $d$ is first adjusted along the table $e$ to bring the gauge into the gauging position on the centre line of the hole $f^1$ in the workpiece $f$, which is carried in chuck jaws $g$ as shown, or in any other convenient manner. Gauge blocks $h$ are inserted between the body $d$ and the carriage $c$ so that when the former is adjusted along the table to bring the roller into contact with one side of the hole $f^1$, a micrometer $i$ carried by said body and acting on the other end of the carriage is at the zero position. An adjusting screw $j$ threaded in a hole in a lug $k$ on the table $e$ bears against one end of the body $d$ to facilitate adjustment of the latter. The gauge body is then locked to the table by means of a clamping bolt $l$ secured to the latter and passing through a slot $m$ in the former. The gauge blocks are removed and the carriage is now moved by means of the micrometer to displace the roller diametrally into contact with the other side of the hole and the reading of the micrometer plus the known diameter of the roller will give the diameter of the hole. This may be checked by the re-insertion of gauge blocks between the carriage and the gauge body. Alternatively, the micrometer may be dispensed with and the distance moved by the roller and carriage be ascertained by means of gauge blocks alone.

In order to ensure that the serrations on the roller have properly engaged the threads in the hole, means, such as a rod $n$ attached to the roller, are provided for giving a rotational and axial movement to the roller on its pin when within the hole being gauged in order that the roller may properly contact or feel the threads of the hole.

Figure 3:
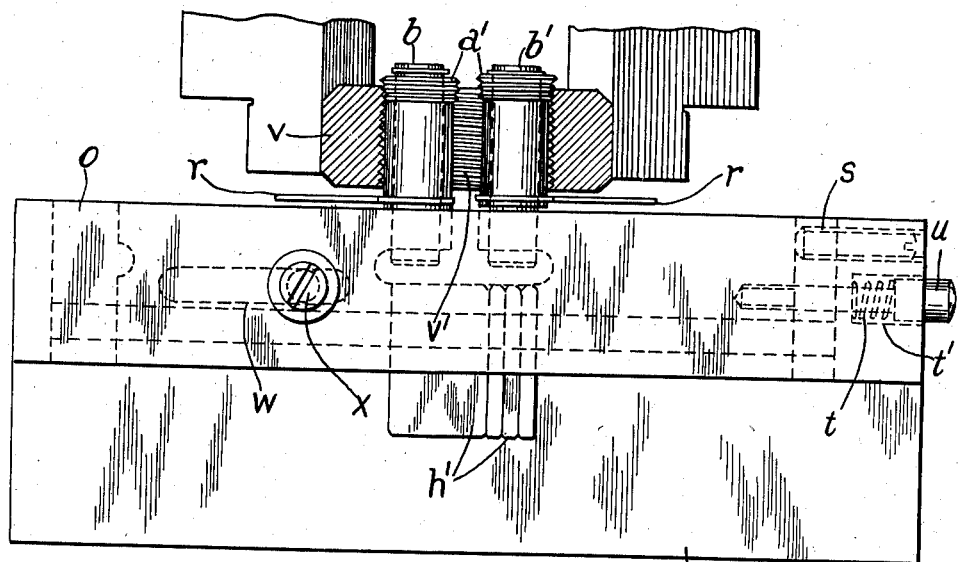
Figure 3 is a view similar to Figure 1 of a modified form of the gauge.
Figure 4:
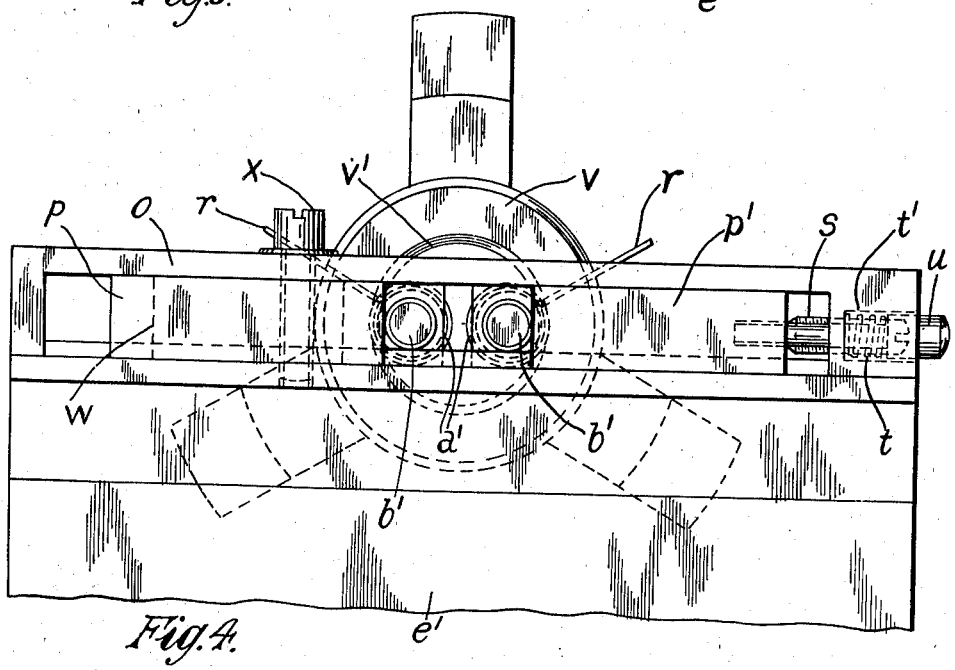
Figure 4 is a side elevation of the gauge shown in Figure 3.

In another form, shown in Figures 3 and 4, suitable more particularly for larger holes two rollers or gauging members $a^1$, $a^1$ are employed. In this form the gauge body $o$ houses two carriages one ($p$) of which is fixed during the gauging operation and can be pre-set and reversed, whilst the other $p^1$ is free and movable towards and away from the first carriage. Each carriage carries one of the serrated gauging rollers rotatably mounted on a pin $b^1$ on the carriage and feelers, such as $r$, $r$ are provided on each roller for giving a rotational and axial movement thereto to ensure the serrations properly engage the threads in the hole. A setting screw $s$ threaded in a hole in the body may be provided for locking the carriage $p^1$ against gauge blocks $h^1$ which are first inserted between the adjacent ends of the two carriages so that a measurement can be taken over the rollers.

The movable carriage $p^1$ is urged away from the fixed carriage $p$ by means of a spring $t$ within a hole $t^1$ in the body $o$. One end of said spring bears against the latter and the other end against a stepped portion of a pin $u$ on the movable carriage.

In using the gauge, the gauge blocks are removed and the distance between the two rollers reduced by pressing the movable carriage towards the fixed carriage against the action of the spring $t$, which can conveniently be done by pushing the free end of the pin $u$. The rollers can then be inserted in the hole $v^1$ to be gauged in the work piece $v$ and the pressure on the movable carriage released whereupon the spring will displace the two rollers until they make contact with opposite sides of the screw-threaded hole. A reading of the displacement giving the diameter of the hole can then be taken by inserting gauge blocks between the two slides as shown in Figure 3. Alternatively, the displacement of the rollers can be ascertained by means of a micrometer screw, indicator or wedge associated with the movable carriage. When this form of the improved gauge is required for use with holes of relatively small diameter, the rollers may be replaced by gauging elements of D or like section having serrations on the curved portions thereof.

As stated above, the fixed carriage may be reversible so that the gauge can be used for gauging larger holes. As shown this carriage has a central slot $w$ through which is passed a screw $x$ threaded in a hole in the body $o$. This arrangment permits the said carriage to be adjusted or to be reversed so that the gauging roller carried thereby is at a greater distance from the other gauging roller. The carriage can be locked in its reversed and/or adjusted position by means of the screw $x$.

A table or platform $e^1$ is provided on the grinding machine and on which the gauge is loosely mounted so that it can be applied on the centre line of the work to be gauged.

Figure 5:
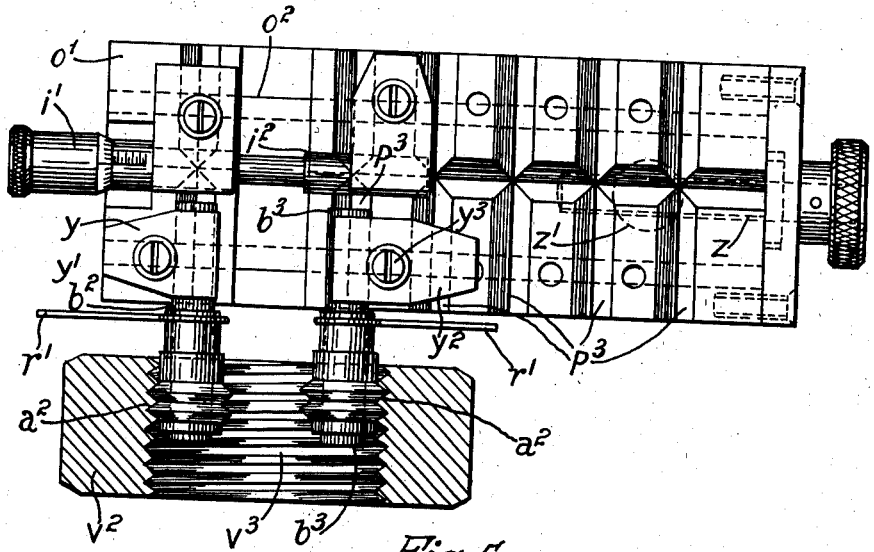
Figures 5 and 6 are views similar to Figures 3 and 4 and show a further modified form of the gauge.
Figure 6:
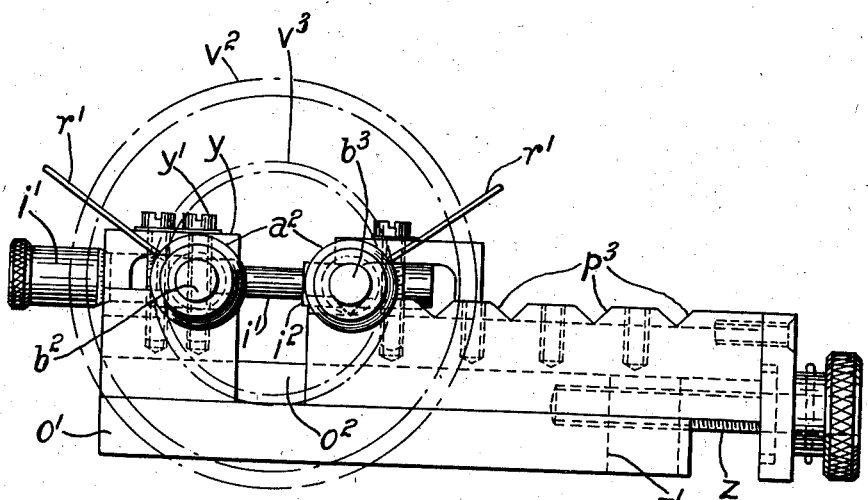

In the further modification shown in Figures 5 and 6, the gauge is made adjustable for use in gauging holes of various diameters and is a development of the construction shown in Figures 3 and 4. In this case one of the two gauging rollers $a^2$ is rotatably mounted on a pin $b^2$ clamped in a V-shaped groove in the body $o^1$ of the gauge by means of a clamping member $y$ and screw $y^1$. The other roller $a^2$ is rotatably mounted on a pin $b^3$ adapted to be clamped by clamping member $y^2$ and screw $y^3$ in one of a series of V-shaped grooves $p^3$ formed in a carriage $p^2$ which latter is mounted to slide on a guide $o^2$ on the gauge body. The carriage is moved on the guide $o^2$ by means of a screw $z$ associated therewith and threaded in a nut $z^1$ in the body.

An initial setting of the gauge may be obtained in conjunction with a master-piece or the like. For this purpose the screw $z$ is operated in a direction to bring the rollers towards one another until they can be inserted between the gauging elements or surfaces of the master piece or the like. The screw $z$ is then operated in the reverse direction to cause the rollers to contact with said gauging elements or surfaces. A micrometer $i$ clamped to the gauge body is then adjusted to make contact with a block $i^2$ clamped to the carriage and the reading of the micrometer will correspond to the master piece or the like being used.

In use, the gauge is loosely mounted on the grinding machine bed or a table thereon, not shown, and adjusted to the centre line of the hole to be gauged in a manner similar to that described with reference to Figures 3 and 4. The carriage is then adjusted by means of the screw $z$ to bring the gauging rollers towards one another so that they can enter the hole $v^3$ in the workpiece $v^2$. The screw $z$ is then rotated in the reverse direction to separate the rollers until they make contact with opposite sides of the screw-threaded hole. The micrometer screw is now adjusted until contact is made with the block $i^2$ and a comparison can then be made between the present micrometer reading and the initial reading taken with the master-piece or the like.

The gauge is shown with the pin $b^3$ secured in the first of the series of V-shaped grooves $p^3$, for gauging holes of relatively small diameter. For gauging larger holes the pin $b^3$ can be clamped in the appropriate groove and a fresh initial reading of the micrometer taken in conjunction with an appropriate master-piece or the like. Alternatively, the known distance between the first groove and the one selected, may be added to the micrometer reading to give a correct measurement of the hole being gauged. The block $i^2$ may, if desired, be replaced by a longer one corresponding to the groove $p^3$ being used and adjacent which it may be clamped.

In this case also, a feeler, such as $r^1$ is provided on each roller for giving a rotational and axial movement thereto. The rollers may be replaced by gauging elements of D or like section having serrations on the curved portions thereof for use in gauging holes of relatively small diameter.

In any of the above described forms of the improved gauge, the serrations on the rollers may be discontinuous or have longitudinal flats formed thereon to facilitate entry and withdrawal thereof with respect to the hole to be gauged.

We claim:

1. An internal screw thread gauge for gauging the thread of a cylindrically bored internally screw threaded fixedly supported work piece, said gauge comprising a gauge body, a carriage mounted for linear movement on said body perpendicular to the axis of the bore of said work piece, and gauging means carried by said gauge comprising a gauging member mounted on said carriage in axially parallel relationship to said bore for movement diametrically thereacross during movement of said carriage.

2. An internal screw thread gauge for gauging the thread of a cylindricaly bored internally screw threaded fixedly supported work piece, said gauge comprising a gauge body, a carriage mounted for linear movement on said body perpendicular to the axis of the bore of said work piece, and a rotatable freely axially movable gauging member carried by said carriage in axially parallel relationship to said bore for movement diametrically thereacross during movement of said carriage, said gauging member being formed with external thread form serrations to engage with the threads of said bore.

3. An internal screw thread gauge for gauging the thread of a cylindrically bored internally screw threaded fixedly supported work piece, said gauge comprising a gauge body, a pair of carriages mounted for linear movement relative to each other on said body perpendicular to the axis of the bore of said work piece, and a gauging member carried by each said carriage in axially parallel relationship to said bore for diametrical movement relative thereto during movement of its respective carriage.

4. An internal screw thread gauge for gauging the thread of a cylindrically bored internally screw threaded fixedly supported work piece, said gauge comprising a gauge body, a carriage mounted for linear movement on said body perpendicular to the axis of the bore of said work piece, a gauging member carried by said body, and a gauging member carried by said carriage for movement diametrically across said bore towards and away from said first mentioned gauging member during movement of said carriage.

5. An internal screw thread gauge for gauging the thread of a cylindrically bored internally screw threaded fixedly supported work piece, said gauge comprising a gauge body, a carriage mounted for linear movement on said body perpendicular to the axis of the bore of said work piece, a gauging member carried by said body, and a gauging member carried by said carriage for movement diametrically across said bore towards and away from said first mentioned gauging member during movement of said carriage, both of said gauging members being rotatably and freely axially movably mounted in axially parallel relationship to said bore, and provided with external thread form serrations to engage the threads of said bore.

6. An internal screw thread gauge for gauging the thread of a cylindrically bored internally screw threaded fixedly supported work piece, said gauge comprising a gauge body, a carriage mounted for linear movement on said body perpendicular to the axis of the bore of said work piece, and formed with a series of transverse grooves, a pin secured in one of said grooves, a gauging member carried by said body, and a gauging member freely rotatably and axially movably mounted on said pin for movement diametrically across said bore in a direction towards and away from said first mentioned member during movement of said carriage.

STANLEY JAFFA HARLEY.
JOHN ERNEST WAINWRIGHT.